March 9, 1943.  F. H. CARMAN  2,313,508
METHOD OF MAKING CONTINUOUS SHEETS OR ROLLS OF GASKET MATERIAL
Filed Jan. 23, 1940  2 Sheets—Sheet 1

Inventor
Frank H. Carman
by
Walter & Kaufman
Attorney

Patented Mar. 9, 1943

2,313,508

UNITED STATES PATENT OFFICE 2,313,508

METHOD OF MAKING CONTINUOUS SHEETS OR ROLLS OF GASKET MATERIAL

Frank H. Carman, Lancaster, Pa., assignor to Armstrong Cork Company, Lancaster, Pa., a corporation of Pennsylvania Application January 23, 1940, Serial No. 315,232

4 Claims. (Cl. 154—33.1)

This invention relates to continuous sheets or rolls of gasket material and a method of making the same and, more particularly, to a continuous sheet or roll of gasket material suitable for severance in strips adapted to be placed in a metal channel to receive a window glass and to conform to the channel and to the glass. Such strips serve to cushion and to reduce the transmission of shocks to the glass, securely hold the glass in the channel, form a waterproof joint between the glass and the metal channel forming its supporting frame, and eliminate squeaks and rattles created by the glass rubbing against the metal channel.

It is particularly desirable that a gasket strip for such use be extensible to permit stretching longitudinally and laterally of its longitudinal axis in order that it may conform to the shape of the channel and the window; likewise, it need be flexible in order that such stretching does not break or crack its coating. If the strip be substantially inextensible, needless to say, it cannot conform satisfactorily to the glass since it cannot be drawn thereabout but gathers in folds and wrinkles at the corners of the glass. If the strip be substantially inextensible, frequently enormous pressures are applied in an attempt to conform the strip to the glass which in many cases, cracks, breaks or distorts the glass. If the glass be laminated, such as safety glass, the soft plastic binder holding the sheets of glass as a unit extrudes under such pressures, thus destroying the value of the glass for its intended purpose.

Additionally, gasket strips to be satisfactory for such service should be moisture-resistant, compressible and economical. This last requirement necessitates that the material be made in continuous sheets or rolls; such sheets generally are about two hundred lineal yards in length and strips severed therefrom should be at least one hundred feet in length. If the base be fabric, it is essential that the threads thereof do not unravel in use. The gasket strip should be tacky or adhesive so that it positively adheres to the glass in use.

The chief object of my invention is to provide a gasket strip possessing the desirable characteristics enumerated above. An object of my invention is to provide a continuous sheet or roll of gasket material suitable for severance in strips adapted to be placed in a metal channel to receive a window glass and to conform to the channel and to the glass. A further object is to provide an extensible, unravellable, tacky gasket strip which may be stretched to conform to a glass and which adheres to such glass, even in stretched position in use. A still further object is to provide a method of making a continuous, extensible sheet or roll of gasket material.

This invention relates to a continuous, extensible sheet of gasket material suitable for severance into strips adapted to be placed in a metal channel to receive a glass and to conform to the channel and to the glass, comprising an extensible fabric having a thin, flexible coating thereon, the threads of said fabric extending diagonally of the longitudinal axis of the sheet.

This invention further relates to a method of making a continuous, extensible sheet of gasket material in which the steps comprise coating a substantially inextensible woven fibrous sheet having its warp threads extending longitudinally thereof with a moisture-resistant substance, severing said sheet diagonally into sections, assembling the severed sections to form a continuous extensible sheet in which the warp and filler threads extend diagonally of the axis of the sheet, and securing a thin, flexible coating thereon.

The attached drawings illustrates a preferred embodiment of my invention, in which Figure 1 is a plan view of the preferred form of gasket strip, partially broken away to illustrate the extensible fabric;

Figure 1:
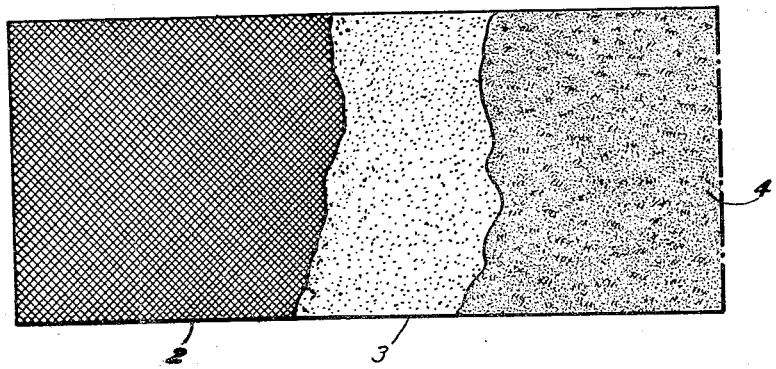

In the illustrated embodiment of my invention, there is shown a gasket strip comprising a continuous extensible fabric 2 having its warp and filler threads extending diagonally of the longitudinal axis of the fabric and, preferably, at a 45° angle thereto for maximum and uniform extensibility. Such fabric is impregnated or coated with a thin layer 3 of moisture-resistant substance and carries thereon a thin flexible coating 4 of cork and unvulcanized rubber composition. The fabric may consist of any suitable woven material but it is essential that the warp and filler threads thereof extend diagonally of the longitudinal axis of the sheet to impart the property of extensibility to the finished material and to obviate unravelling of the threads of the fabric in the finished product; the fabric I prefer to use is that known in the industry as Osnaburg sheeting, a cotton fabric which in 40" width runs approximately 3½ lineal yards to the pound and has a thread count of approximately 36 warp threads and 28 filler threads per square inch and which may be dyed if desired. I have found such a fabric base is eminently satisfactory for my purposes when prepared and treated as hereinafter described.

The moisture-resistant substance 3 may comprise latex or other rubber dispersions or solutions which after evaporation or removal of moisture or solvent leave a moisture-resistant residue. Any waterproofing solution may be used, however, provided it is adhesive and possesses the qualities of flexibility and ease of impregnation. Since such coating solutions are well known in the industry, it is not believed a lengthy description of the process of making such compositions is required.

The fabric 2 is then passed through a rubber calender and the coating 4 of cork and unvulcanized rubber composition applied thereto. If desired, similar coatings may be applied to both faces of the fabric. Preferably, such coating is formed as shown in the copending application of Bruce R. Billmeyer, Serial No. 315,231, filed January 23, 1940, which discloses a cork and unvulcanized rubber composition formed of a mixture of 65 parts crepe rubber, 70 parts reclaimed rubber, 100 parts Trinidad asphalt, 20 parts rosin oil, 5 parts petrolatum, 50 parts of cotton fibers, 100 parts of whiting, and 50 parts of 20/40 cork granules, mixed together on a standard two-roll rubber mill.

Reclaimed rubber consists of approximately 50% rubber hydrocarbon and 50% non-rubber constituents. Accordingly, I use the term "rubber hydrocarbon" to denote the amount of rubber present in the composition; thus it will be noted the rubber hydrocarbon (65 parts crepe rubber plus 50% of 70 parts reclaimed rubber yielding 35 parts rubber) and the asphalt are present in the composition in substantially equal proportions. By 20/40 cork granules is meant granulated cork which will pass a 20 mesh/inch screen and lie on a 40 mesh/inch screen. Where a more dense or lighter composition is desired, finer or larger cork granules may be used. It will be understood my invention is not limited to the use of such specific type of flexible, compressible tacky coating, since I have found other types of coatings are satisfactory for various uses when used as a coating on the extensible fabric of my invention.

Figure 2:
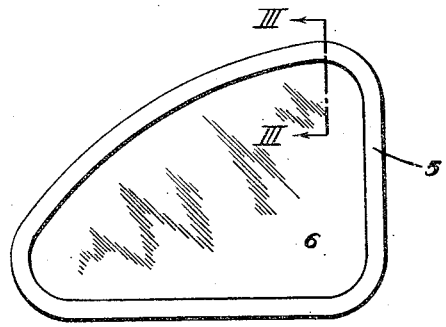
Figure 2 is a view in elevation illustrating a glass mounted in a metal frame of channel shaped cross section wherein the edge of the glass is sealed by using a gasket strip constructed in accordance with my invention.
Figure 3:
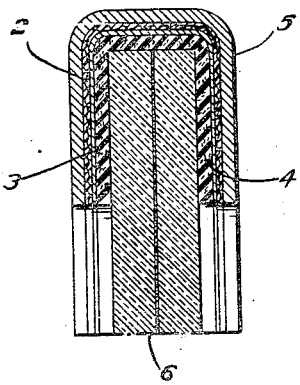
Figure 3 is a sectional view taken on the line III—III of Figure 2.

As illustrated in Figures 2 and 3, a strip is cut to size and placed in a metal channel 5 forming a frame to receive the glass 6. The extensible strip is stretched to conform to the glass and the channel and, if a coating composition of the type described above is used, definitely adheres to the glass. If the composition be applied on both sides of the fabric 2, it likewise adheres to the channel 5. As shown in Figures 2 and 3, the gasket strip may be stretched to conform to curved surfaces and rounded corners and does not gather in folds or wrinkles at such corners so as to necessitate doubling thereabout. This, of course, assists in the elimination of glass breakage during the assembly operation since it does away with the great pressures formerly applied in an attempt to force such portions of the strip to lie flat and conform to the contours of such surfaces.

Figure 4:
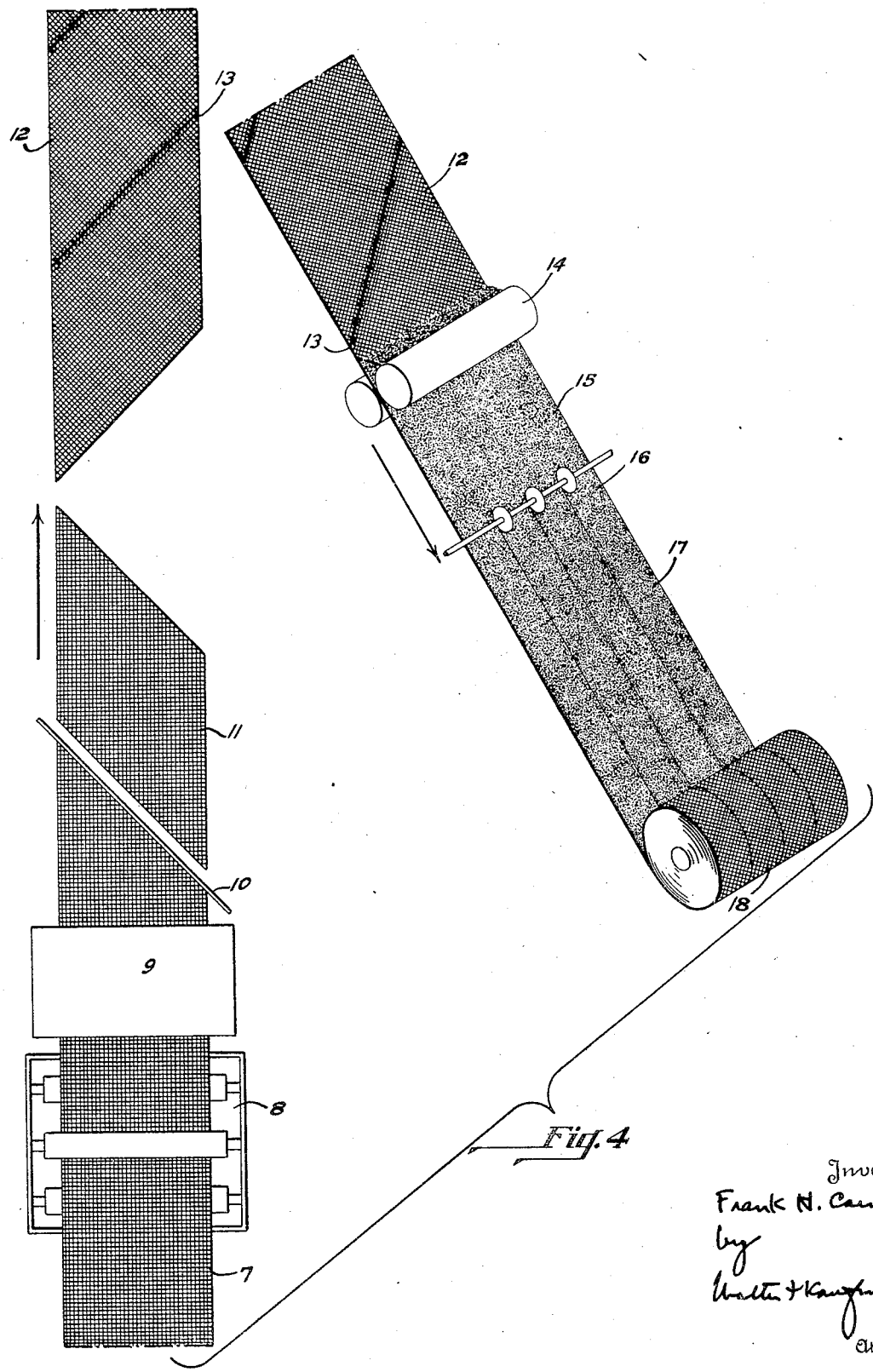
Figure 4 is a view diagrammatically illustrating the method of manufacture of such gasket strip.

The gasket material of my invention is formed in continuous sheets or rolls in the following manner. Referring to Figure 4, a sheet of woven substantially inextensible fabric 7 having its warp threads extending longitudinally thereof, such as the Osnaburg sheeting above described, is passed through a saturating tank 8 filled with a moisture-resistant substance, such as latex or other rubber dispersions or solutions and is coated and impregnated with such substance. Any excess solution on the fabric may be removed by running the fabric 7 through rollers or, if desired, the solution may be applied to the fabric by means of scraper or spreader blades. The coated or impregnated fabric is then passed through a drying oven 9 to remove or evaporate moisture or solvent. The coated fabric is then passed through any suitable cutting instrument 10 which severs the fabric diagonally, preferably at a 45° angle to the direction of the warp threads, into rhomboidal segments or sections 11. The rhomboidal sections 11 are turned through an angle other than a right angle or multiples thereof, preferably, a 45° angle to avoid waste, and assembled to form a continuous extensible sheet 12 in which the warp and filler threads extend diagonally of its length. The segments 11 may be secured together in any desired manner, for example, by stitching as shown at 13, to form the continuous extensible sheet 12. Preferably, the segments 11 are not overlapped but are placed in contiguous relation and stitched together, the stitches 13 extending from one to the other of such segments, securely holding the segments in unitary relationship with one another.

The extensible fabric 12 is passed through a rubber calender 14 and the cork and unvulcanized rubber composition is applied thereto, thus forming a continuous extensible sheet 15 of gasket material. If desired, a similar coating may be applied to the opposite face of the sheet. Preferably, the continuous sheet 15 is severed longitudinally thereof and diagonally of the threads of the extensible fabric 12 by any suitable cutting instrument 16 into a plurality of continuous strips 17 of gasket material which may be formed in rolls 18 for shipment to the place of use. Such method of manufacture obviates waste when the continuous strips of gasket material are cut to size and conformed to the metal channel to receive and cushion the glass. Needless to say, if such material were furnished in short lengths, a considerable amount of gasket material would be wasted in cutting to size since it is essential from a commercial standpoint that a single continuous strip be used for each glass.

While I have described the method of making my preferred material as a continuous process, it will be appreciated my invention is not so limited since the coated fabric, after the drying operation, may be transferred to some other place where it may be severed into sections, such sections being formed into a continuous extensible sheet as described above. Likewise, after the continuous extensible sheet has been formed, it may again be transferred to some other place where the thin, flexible coating may be applied. If desired, the moisture-resistant coating may be applied after the continuous extensible fabric is formed, although this is more expensive and not so satisfactory as the above described procedure. For some uses, the moisture-resistant coating may be eliminated in entirety.

If desired, an extensible fabric similar to the fabric 12 shown in Figure 4 may be produced by spirally or helically severing a circularly woven fabric tube in such manner that the warp and filler threads extend diagonally of the longitudinal axis of the sheet or strip so produced. The permanently tacky composition may be placed on the circularly woven fabric tube before it is severed helically into extensible strips or the tube may be severed helically into strips and coated with the composition as desired.

All woven fabrics are, of course, extensible to some slight degree. The term "substantially inextensible" is used herein to denote a fabric possessed of only such slight degree of extensibility as is inherent in woven fabrics, while the term "extensible" is used herein to denote a fabric possessing vastly increased extensibility, longitudinally and laterally thereof, due to the warp and filler threads running diagonally of the longitudinal axis of the sheet.

When the warp and filler threads extend diagonally of the longitudinal direction of the fabric, a strip formed therefrom having the threads similarly arranged is extensible into a shape similar to and adapted to fit the channel into which it is to be inserted merely by pulling the ends of the strip. Since the warp and filler threads of the strip extend diagonally of the longitudinal direction of the strip, it may be trimmed or severed to desired size without unravelling of the threads or permitting fringed edges to form about the strip. This is an important feature of my invention for such fringed edges are unsightly and detract from the appearance of the completed installation.

My invention provides a compressible gasket strip possessing recovery characteristics which in use cause it to fill all voids between the window glass and the metal channel forming its supporting frame. It is extensible so that it may be stretched to conform to corners and curved assemblies and is tacky so that it permanently adheres to the glass during use. The fabric is dark in appearance so that it is substantially invisible when the gasket strip is in use. It is moisture-resistant, thereby enhancing its life and permitting it to be used for long periods without replacement.

While I have described and illustrated a preferred embodiment of my invention, it will be understood my invention is not limited thereto, since it may be otherwise embodied and illustrated within the scope of the following claims.

I claim:

1. In the method of making a continuous, extensible, tacky sheet of gasket material, the steps which comprise severing a substantially inextensible woven cotton sheet having its warp threads extending longitudinally thereof diagonally into sections, assembling the severed sections with a vertical edge of one section disposed in abutting relationship to a vertical edge of a second section disposed in the same plane, securing adjacent sections to one another by stitches extending from one section to the adjacent section to form a continuous extensible sheet in which the warp and filler threads extend diagonally of the axis of the sheet, and calendering thereon a thin, tacky, compressible coating including cork granules, rubber and asphalt.

2. In the method of making a continuous, extensible sheet of gasket material, the steps which comprise coating a substantially inextensible woven fibrous sheet having its warp threads extending longitudinally thereof with a moisture-resistant substance, severing said sheet at an angle to the warp threads, turning the severed sections through an angle other than a right angle or multiples thereof, assembling said turned sections with a vertical edge of one section disposed in abutting relationship to a vertical edge of a second section disposed in the same plane, securing adjacent sections to one another by stitches extending from one section to the adjacent section to form a continuous extensible sheet in which the warp and filler threads extend diagonally of the axis of the sheet and in which the stitching also extends diagonally of the axis of the sheet, and calendering a thin flexible coating thereon.

3. In the method of making a continuous extensible sheet of gasket material, the steps which comprise coating a substantially inextensible woven fibrous sheet having its warp threads extending longitudinally thereof with an unvulcanized rubber composition, severing the coated sheet diagonally of the warp threads into rhomboidal sections, turning the sections through a 45° angle, disposing the turned sections in adjacent relationship with a vertical edge of one section disposed in abutting relationship to a vertical edge of a second section disposed in the same plane, stitching the sections together at abutting edges to form a continuous extensible sheet in which the warp and filler threads extend at a 45° angle to the axis of the sheet and in which the stitching extends diagonally of the axis of the sheet, calendering a permanently tacky flexible coating thereon, said coating including rubber hydrocarbon, asphalt, filler and fibers, and severing said continuous extensible sheet into continuous extensible strips of gasket material.

4. In the method of making a continuous extensible sheet of gasket material, the steps which comprise coating a substantially inextensible woven fibrous sheet having its warp threads extending longitudinally thereof with an unvulcanized rubber composition, severing the coated sheet diagonally of the warp threads into rhomboidal sections, turning the sections through a 45° angle, assembling the turned sections with a vertical edge of one section disposed in abutting relationship to a vertical edge of a second section disposed in the same plane, securing adjacent sections to one another by stitches extending from one section to an adjacent section to form a continuous extensible sheet in which the warp and filler threads extend at a 45° angle to the axis of the sheet and in which the stitching extends diagonally of the sheet, calendering a compressible, permanently tacky coating thereon, said coating including rubber hydrocarbon, asphalt, cork granules and fibers, the rubber hydrocarbon and the asphalt being present in the composition in substantially equal proportions, and severing said continuous extensible sheet normally thereof and diagonally of the threads of the woven sheet to form continuous extensible strips of gasket material.

FRANK H. CARMAN.